June 9, 1964

R. W. PATEE 3,136,378

SNOW VEHICLE

Filed July 25, 1961

INVENTOR.
ROBERT W. PATEE
BY
Richard W. Hanes
ATTORNEY

June 9, 1964 R. W. PATEE 3,136,378
SNOW VEHICLE
Filed July 25, 1961 6 Sheets-Sheet 2
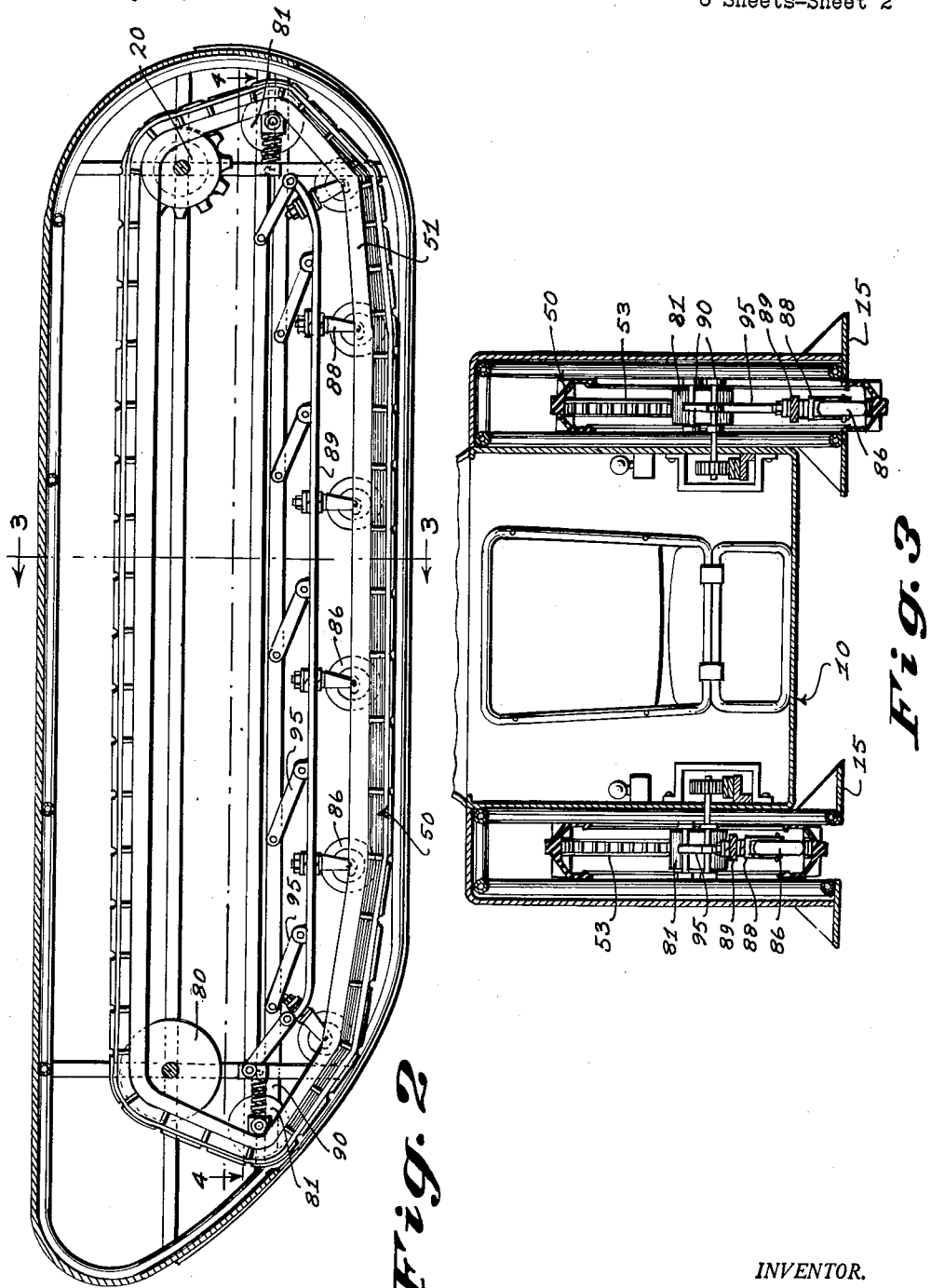
INVENTOR.
ROBERT W. PATEE
BY
Richard W. Hanes
ATTORNEY June 9, 1964   R. W. PATEE   3,136,378
SNOW VEHICLE
Filed July 25, 1961   6 Sheets-Sheet 3
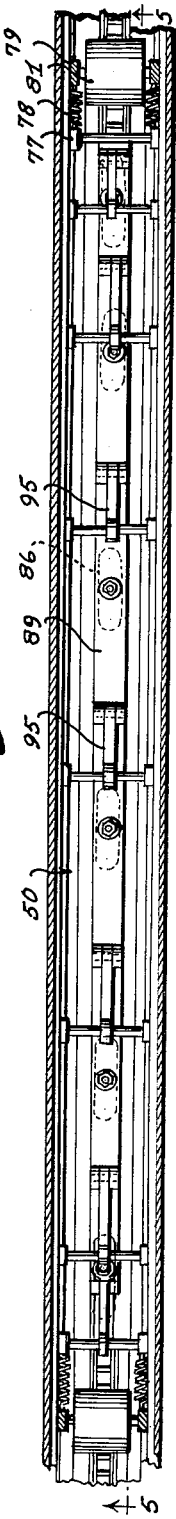
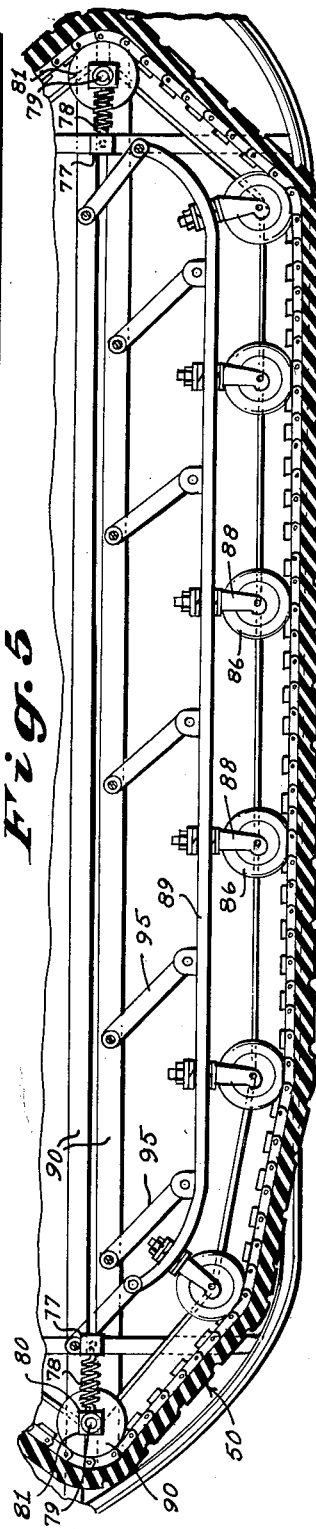
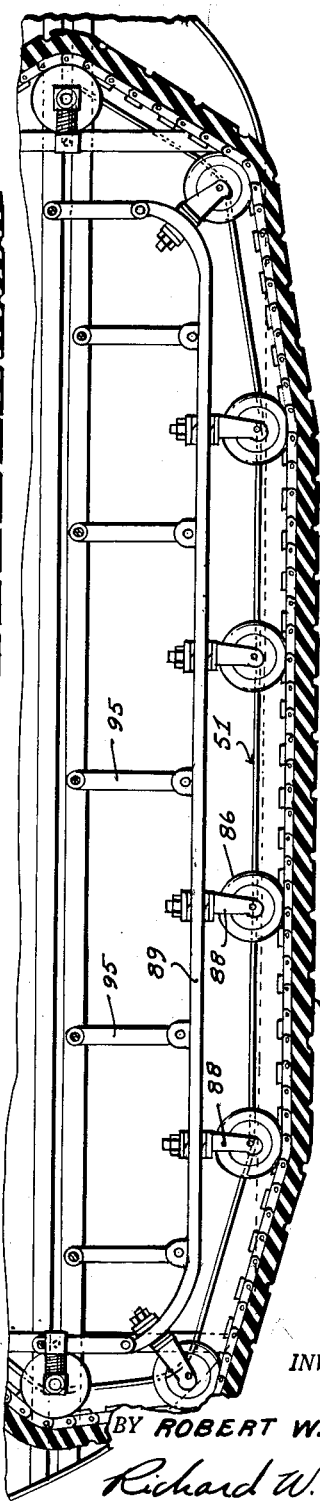
INVENTOR.
BY ROBERT W. PATEE
Richard W. Hanes
ATTORNEY June 9, 1964 R. W. PATEE 3,136,378
SNOW VEHICLE
Filed July 25, 1961 6 Sheets-Sheet 4
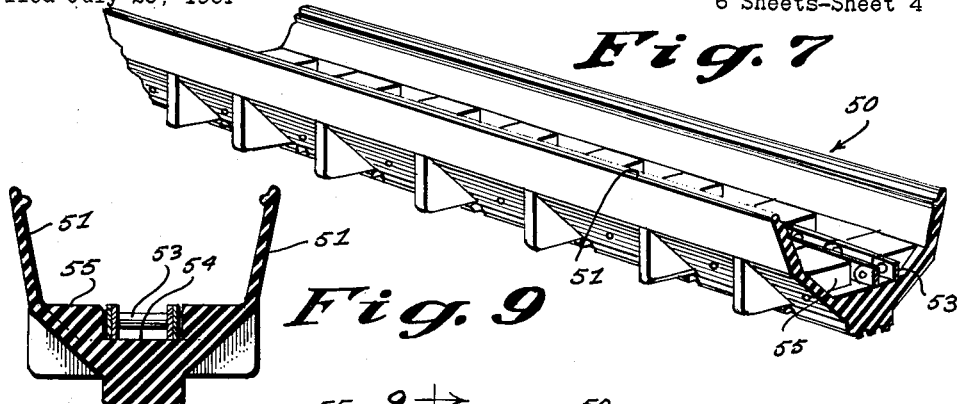
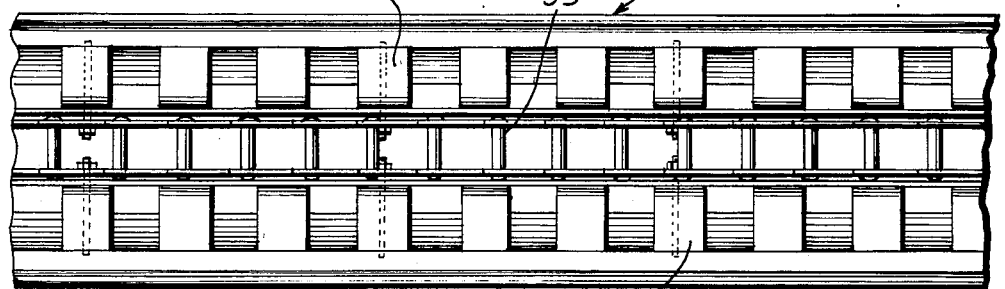
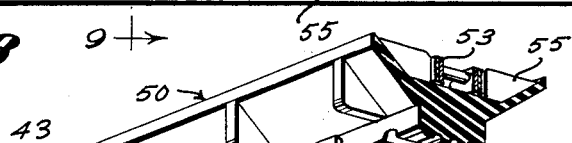
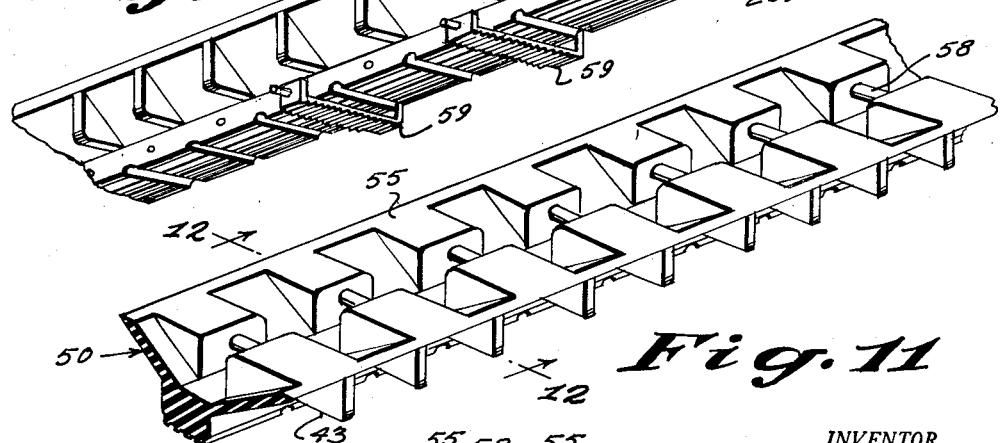
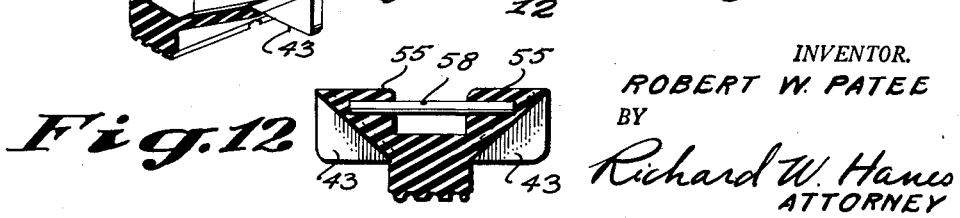
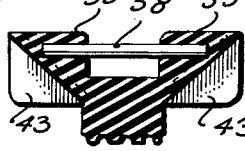
INVENTOR.
ROBERT W. PATEE
BY
Richard W. Hanes
ATTORNEY

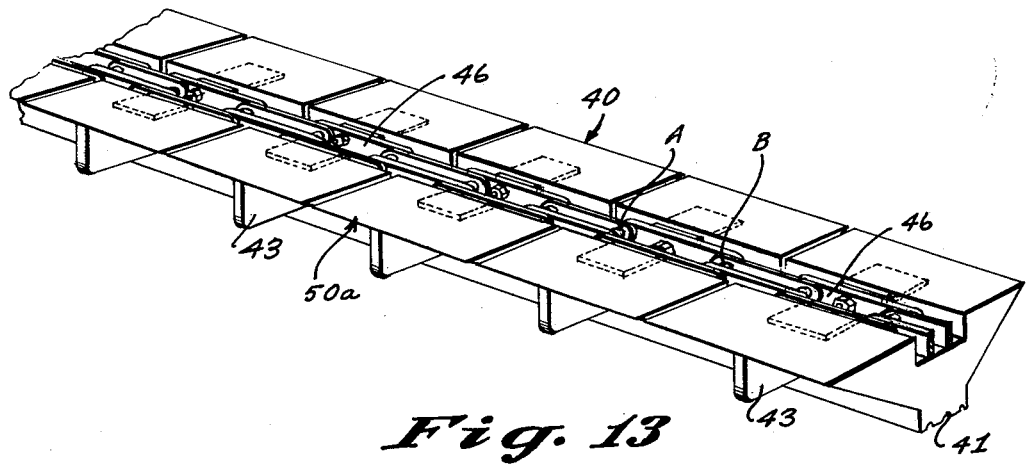
Fig. 13
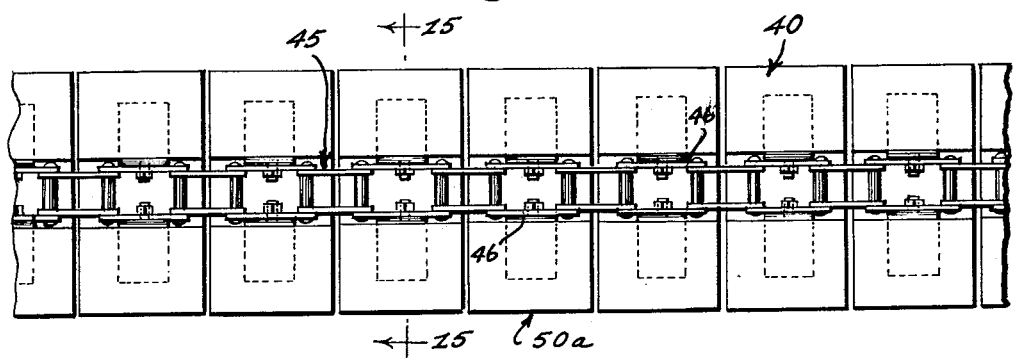
Fig. 14
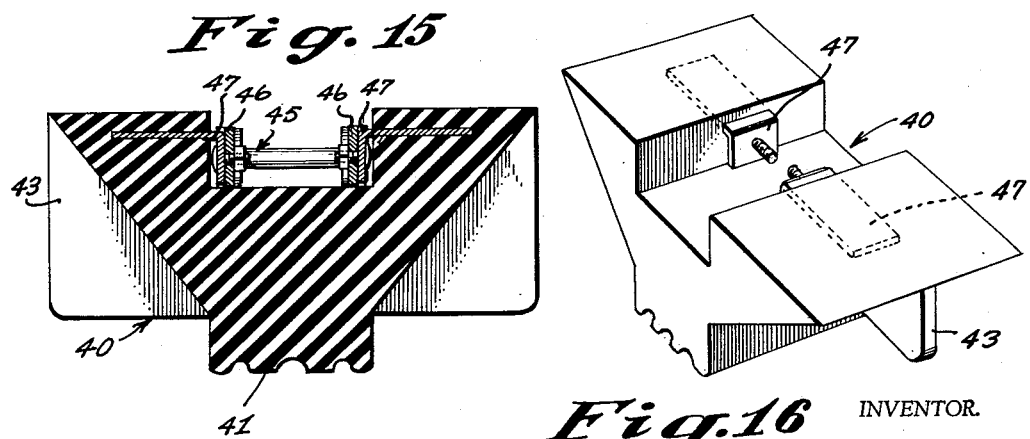
Fig. 15
Fig. 16
INVENTOR.
ROBERT W. PATEE
BY
Richard W. Haines
ATTORNEY INVENTOR.
ROBERT W. PATEE
BY
Richard W. Hanes
ATTORNEY United States Patent Office 3,136,378
Patented June 9, 1964

3,136,378
SNOW VEHICLE
Robert W. Patee, 17 El Sereno Drive,
Colorado Springs, Colo.
Filed July 25, 1961, Ser. No. 126,706
1 Claim. (Cl. 180—5)

The present invention relates primarily to track laying vehicles and is particularly directed to that type of vehicle used and operated on snow or boggy terrain.

*General*

This application is filed as a continuation-in-part of my co-pending application for Snow Vehicle, filed September 1, 1959, and bearing Serial Number 837,417, now Patent No. 3,063,401. The disclosure of that application regarding the type of vehicle involved and the objects and purposes of providing a powered track laying vehicle which is readily convertible into a sliding toboggan are all applicable to the instant disclosure.

The primary object of the invention disclosed herein as new matter over the disclosure of my said co-pending application is to mechanically simplify and improve the powered convertible toboggan concept of the earlier application.

A second object of the invention is to provide a track, the bottom run of which can be raised out of contact with the surface over which the vehicle is traveling and lowered into traction with the surface.

Another object of the invention is to provide apparatus to quickly convert the powered track laying vehicle into a sliding toboggan-type sled vehicle.

Other objects, advantages, and features of the invention will become apparent as the specification is read in conjunction with the accompanying drawings.

In the drawings:

FIGURE 2 is a cross section on line 2—2 of FIGURE 1 of the improved snow vehicle.

FIGURE 3 is a cross section on line 3—3 of FIGURE 1 of the vehicle showing the right hand track in an extended position and the left hand track in a retracted position.

FIGURE 4 is a cross sectional view along line 4—4 in FIGURE 2.

FIGURE 5 is a cross sectional view along line 5—5 of FIGURE 4 showing the track in a partially extended position.

FIGURE 6 is a corresponding cross sectional view to that of FIGURE 5 showing the track in fully extended position.

FIGURE 7 is a perspective view of a form track which may be employed on the improved snow vehicle of the present invention.

FIGURE 8 is a plan view of the track shown in FIGURE 7.

FIGURE 9 is a cross section taken along line 9—9 in FIGURE 8.

FIGURE 10 is a perspective view of a single piece form track similar to the one shown in FIGURE 7 except that the one in FIGURE 10 has no upstanding side wall portions. The track of FIGURE 10 is shown with detachable ice cleats.

FIGURE 11 is a perspective view of a still further modification of the basic form track of FIGURE 7, having the centrally disposed chain replaced with a series of lateral bars.

FIGURE 12 is a cross sectional view of the track shown in FIGURE 11 taken along line 12—12 in FIGURE 11.

FIGURE 13 is a perspective view of a portion of the preferred embodiment of the track intended for use on the improved snow vehicle of the present invention.

FIGURE 14 is a plan view of the track shown in FIGURE 13.

FIGURE 15 is a cross sectional view taken along line 15—15 of the track of FIGURE 14.

FIGURE 16 is a perspective view of one tread block which comprises the track shown in FIGURE 13.

*Summary*

Briefly, the present invention in a track laying vehicle includes a body and a prime mover, such as a gasoline engine, mounted therein; a pair of revolvable endless tracks disposed on either side of the body and connected through appropriate wheels, gears, and drives to the prime mover; and means mounted on each side of the vehicle and operatively engageable with each of the tracks to raise and lower the bottom run of each of the endless tracks, whereby the bottom run may be raised from or lowered into engagement with the surface over which the vehicle is traveling; and, means to support the vehicle which are integral with the body for supporting the vehicle when the bottom run of the track is raised.

*The Vehicle*

Figure 1:
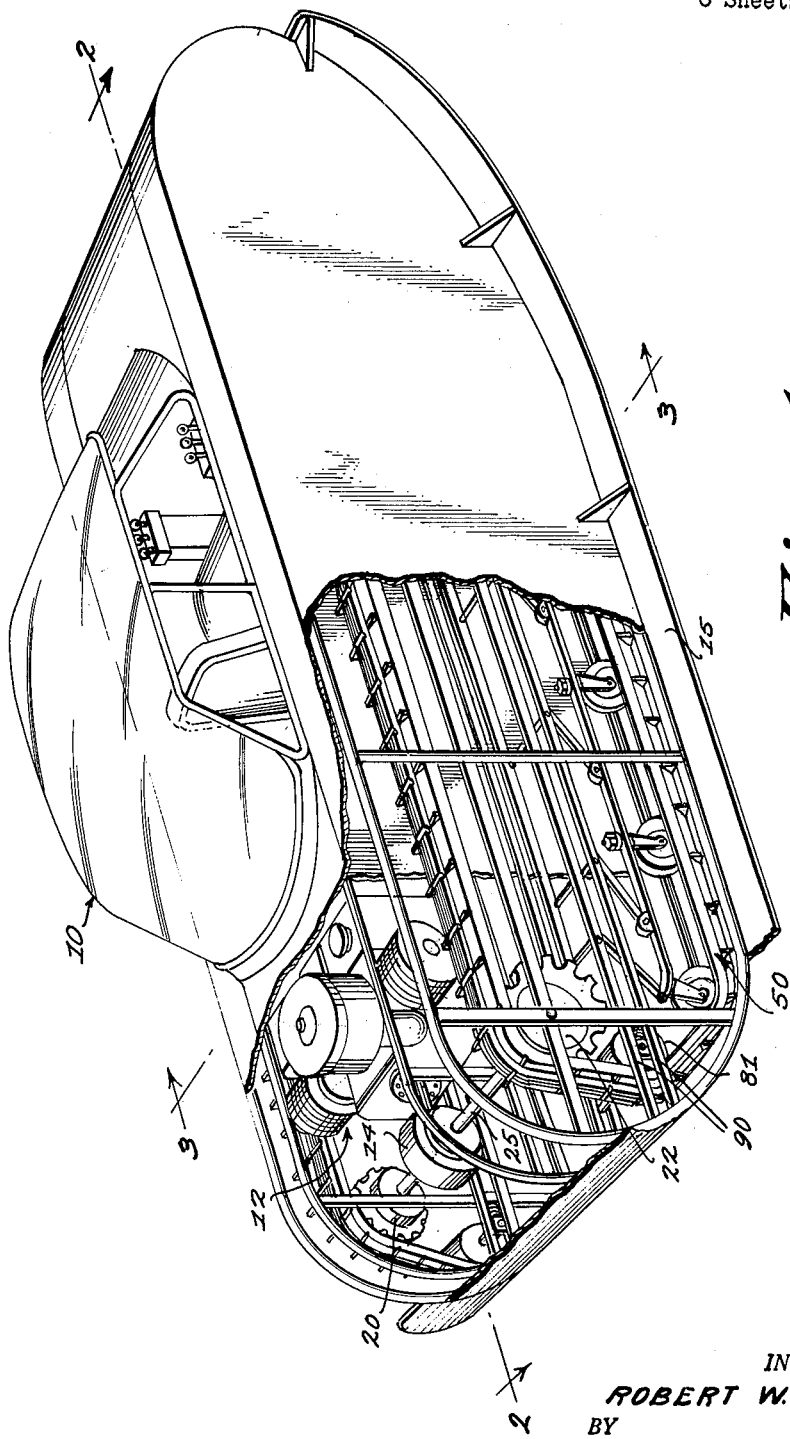
FIGURE 1 is a general view of the improved snow vehicle in perspective with portions cut away to show the interior structure thereof.

Referring now to the drawings for a more detailed explanation of the preferred embodiment of the invention and some suggested modifications, the vehicle is seen generally at 10 in FIGURE 1. The style or design of the body of the vehicle is depicted in FIGURE 1 as an example only of how the present invention can be incorporated in a vehicle. Seen in the rear of the vehicle is a gasoline powered internal combustion engine 12 which serves as a prime mover for the vehicle. A gear box 14 interconnects the power output drive shaft of the engine 12 and a pair of oppositely disposed rear drive wheels 20 and 22 by means of a transverse drive axle 25. Both of the drive wheels are provided with a plurality of cogs around their peripheries for driving engagement with the track of the present invention. The drive wheels 20 and 22 are supported by the framework of the vehicle body as would be apparent to those skilled in the art.

Disposed along the sides of the vehicle body are a pair of crawling tracks 50 which are formed into endless loops and trained around the driving wheels 20 and 22 respectively, and the front and bottom supporting wheels, substantially as in other types of track laying vehicles. The distinguishing features of the present invention in regard to the track and its mounting will become apparent as the specification progresses.

*The Track—First Embodiment*

Referring now to FIGURES 13 through 16 and FIGURES 7 through 12, two embodiments of the endless loop track are illustrated. Because of its apparently greater facility for construction and fabrication, the embodiment 50a shown in FIGURES 13 through 16 is the preferred embodiment. FIGURES 15 and 16 depict a single tread block 40 which comprises the endless track 50a. As seen in cross section, in FIGURE 15, the basic shape of the tread block is substantially that of a Y, the bottom 41 of the stem being the surface engaging portion of the tread block. Projecting laterally from the inclined sides of the body of the block are oppositely disposed fins 43 which coact with the grooved surface engaging portion 41 of the block to give increased traction in snow or boggy terrain. A flat sided parallel linked chain 45 is employed to interconnect the separate tread blocks which comprise the endless loop, each of the side links 46 of the chain 45 being bolted to a bracket 47 which is secured within the tread block 40. The chain 45 is recessed into a longitudinally extending groove in the top portion of each tread block as is clearly seen in the drawings. When a sufficient number of tread blocks 40 have been interconnected, the loop may be trained around the supporting wheels of the vehicle 10 and closed by connecting in well-known fashion the free ends of the chain 45. It will be noted that the chain links are so arranged that two pivotal points A and B are formed within the channel groove of each tread block 40 to provide sufficient bending for the track 50a as it progresses around a curve of small radius formed by the take-up and idler wheels.

The Track—Second Embodiment

The second embodiment 50 of the track applicable to the concept of the present invention is formed by one piece of material, which is shown as rubber, and which is molded directly in the shape of the endless loop for forming a track. The cross sectional shape of the single piece track may be similar to that of the first embodiment, as shown in FIGURE 12, or it may include upstanding side walls 51 to more effectively prevent the entry of snow and foreign material onto the track and its driving chain 53. As shown in FIGURES 7, 8, and 9, the single piece track is equipped with a driving chain 53 similar in construction to the driving chain 45 used interconnecting the tread blocks in the track 50a of the first embodiment. The chain 53 is likewise disposed in a longitudinal groove 54 in the top portion of the track and is bolted to the reinforcing shoulders 55 by any convenient means. In the single piece track, the chain 53 serves only the unitary function of cooperating with the drive wheel over which the track is trained to propel and revolve the track, there being no requirement for the chain to hold parts of the track together as in the embodiment utilizing the tread blocks. Hence, since this function is eliminated, it may be expedient and economically beneficial to eliminate the parallel side link chain 53 in favor of a simpler system of steel bars 58 which are imbedded in reinforcing shoulders 55, which, in large part, define the central groove 54 in the top portion of the track and extend transversely across the center longitudinal groove 54. The bars 58 are so spaced and arranged as to engage the interdental spaces of the cog driving wheel 20 and coating therewith to provide propulsion of the endless track.

As an incidental feature which accrues to the track of either of the two basic embodiments, it is convenient to quickly add ice gripping cleats 59 to the bottom of the track to improve the traction when necessary. The cleats may be of any shape or design desired and may be attached to the surface engaging portion of the track by pinning the cleats 59 to the flexible track through a series of transverse holes in the bottom portion of the track, as shown in FIGURE 10.

Figure 17:
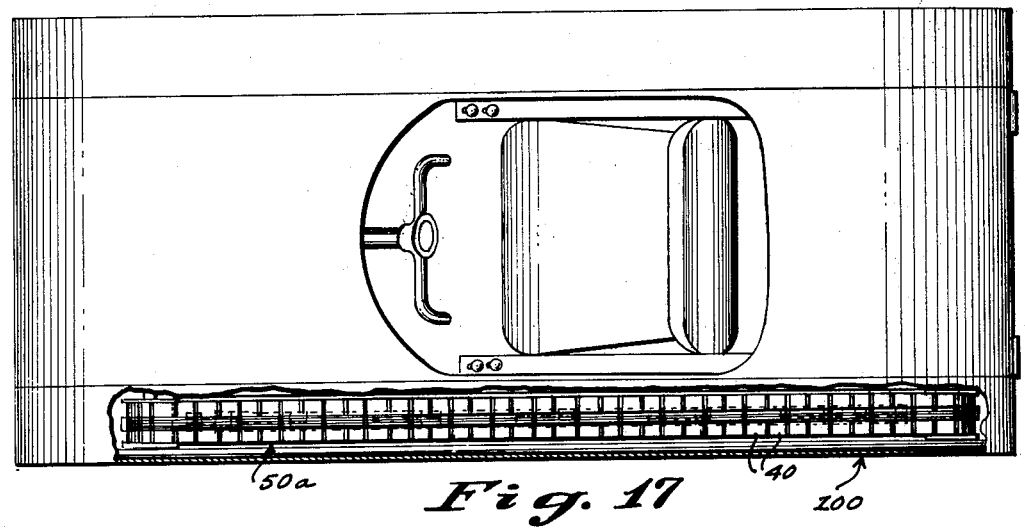
FIGURE 17 is a plan view of a second embodiment of the improved snow vehicle of the present invention.
Figure 18:
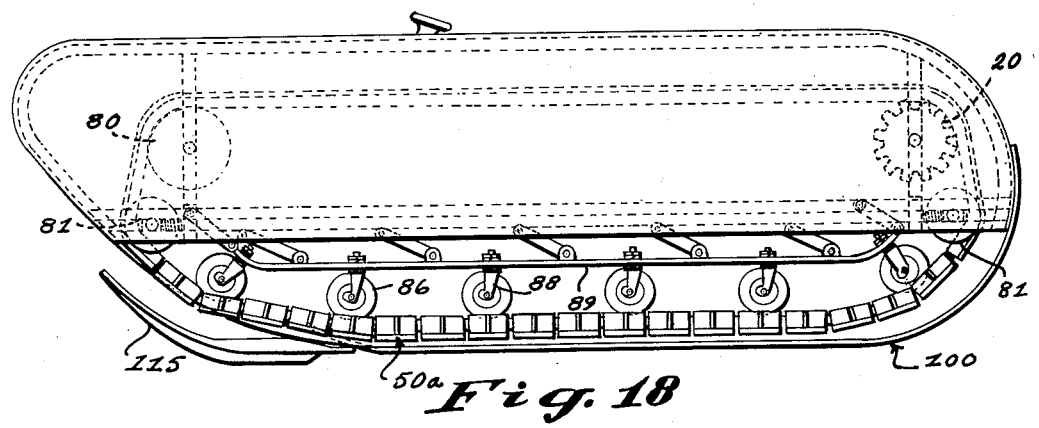
FIGURE 18 is an elevation view of the improved snow vehicle of FIGURE 17, utilizing the preferred track embodiment as shown in FIGURE 13.
Figure 19:
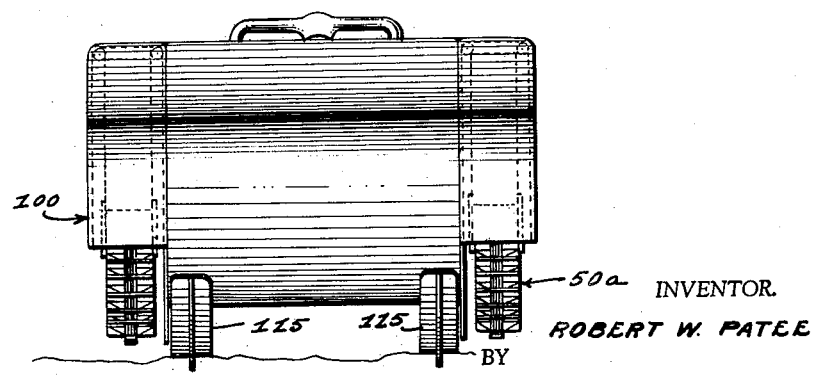
FIGURE 19 is a front view of the improved snow vehicle, second embodiment, showing the track in a raised position.

FIGURES 17, 18, and 19 illustrate a vehicle 100 attached to which is the track of FIGURES 13 through 16 which is indicated as the preferred form; whereas, FIGURES 2 through 6 illustrate the second form of track in place on a vehicle of the type described.

Track Suspension System

For the details of the track suspension system, reference is made especially to FIGURES 2 through 6. In FIGURE 2 the complete system of one track, with the track in the raised position, is illustrated, and since both tracks are alike, only one will be described. A coplanar closed course is formed for the flexible track 50 by a series of wheels which engage the track between its two upstanding sidewalls 51 and along the top of the track, as seen in FIGURE 9 and FIGURE 12, if there are no sidewalls on the track. The series of wheels comprise the cog driving wheel 20; a large forward body mounted idler wheel 80, a pair of spring biased take-up wheels 81 which are mounted in front and back relation in a longitudinal channel 90; and, a plurality of bogey wheels 86 which support the bottom run of the track.

Each of the bogey wheels 86 is rotatably secured between a bifurcated mounting hanger 88 which depends from and is secured to an elongated suspension bar 89 which is arranged to be raised or lowered by the pivotal arms 95 which operatively connect the suspension bar to the body of the vehicle and other mechanism as described in my co-pending application, above referred to. In that co-pending application, the suspension bar is referred to as a camming bar 89 because of its camming function; however, the raising and lowering of the bar is similar in both instances.

As will be apparent from an examination of the drawings, FIGURES 4 and 6, for example, the take-up wheels 81 are biased by means, in this case a spring 78, to maintain a longitudinally outward component of force which tends to force the track 50 into an elongated narrow characteristic, which, of necessity, will draw the top and bottom runs of the track together. However, the forward idler wheel 80 and the driving wheel 20 are fixed in position preventing the downward movement of the top run, thus raising the lower run when the outward force is applied. Such outward force is constantly applied, within the limits of the structural movement of the take-up wheels 81. Each take-up wheel is rotatably mounted on a spindle axle 79 which travels in a channel 90 comprised of two parallel channel members which hold the axles 79. Each biasing spring 78 is secured in a bearing block holding the axle 79 and a fixed stop block 77 attached to the framework of the vehicle in such a position as to hold one end of the spring to provide maximum outward thrust along the channel 90.

Whether or not the track 50 is raised or lowered depends on the position of the suspension bar 89 which controls the position of the track engaging bogey wheels 86. When hydraulic, electrical, or other force rotates the arms 95 attached to the suspension bar clockwise about their pivots from their position shown in FIGURE 2, the bogey wheels 86 exert a downward force on the track 50 sufficient to overcome the force of the biasing springs 78 which exert outward force on the take-up wheels 81. As shown in FIGURE 5, the track may be partially lowered, or lowered to the full extent of the mechanism, depending on the amount of rotation and length of the arms 95 connected to the suspension bar 89.

Obviously, raising of the track is accomplished by raising the suspension bar 89 and the force exerting bogey wheels 86, thus permitting the take-up wheels 81 to move outwardly, raising the bottom run of the track 50.

Operation

As stated previously in my co-pending application, the purpose of such a novel track and suspension system, when used in combination with a vehicle adapted to slide, is to provide a powered sled or toboggan-type vehicle which can be converted from a powered snow tractor to a sledding-type vehicle where no power is required to traverse a downhill course.

As seen in FIGURES 1 and 3, skis 15 are attached to the underside of the body for supporting the vehicle on snow and providing a sliding surface when the tracks 50 are retracted, as shown clearly in FIGURE 19. The vehicle 100 of FIGURES 17, 18, and 19 is shown utilizing the preferred embodiment of the track 50a. The skis 115 are divided toward their forward end so as to enable steering of the vehicle 100 by turning the forward end of the skis, as is well known in the art. Directional control of the vehicle 10 of FIGURE 1, using the second track embodiment 50, is obtained by partially lowering one track or the other, which are individually controllable, so as to provide increased drag on the side of the direction in which a turn is sought. Steering control can be achieved in the powered realm of operation in any one of many well known fashions, such as differential clutching or braking of each individual track.

In addition to the skis shown and illustrated, other methods of sliding the body over snow surfaces may be devised without departing from the spirit and scope of the invention which is limited only by the subsequent claim.

I claim:

A track laying vehicle, including in combination: a body; a prime mover mounted in said body; a pair of revolvable endless tracks having a top run and a bottom run, and disposed on either side of the body and operatively connected to the prime mover; means mounted on each side of the body and operatively engageable with the endless track to raise and lower the bottom run of each of the endless tracks, whereby the bottom run may be raised from or lowered into engagement with the surface over which the vehicle travels; supporting means integral with the body to support the vehicle when the lower run of the track is raised; tensioning means normally biasing the loop of endless track outwardly at its two ends in such a fashion as to decrease the distance between the top run and bottom run of the endless loop of track; said means mounted on the body and operatively engageable with the endless track further including a plurality of rotatably mounted bogey wheels; an elongated longitudinally disposed mounting frame carrying the bogey wheels in a depending relation therewith; a plurality of hanger arms pivotally mounted on the body and pivotally attached to the mounting frame; and power actuated means common to the body pivoted ends of the hanger arms on each side of the vehicle and operatively connected thereto for rotating the arms about the pivotal body mounting, whereby the mounting frame is raised and lowered.

References Cited in the file of this patent

UNITED STATES PATENTS

| | | |
|---|---|---|
| 1,916,375 | Knickerbocker | July 4, 1933 |
| 2,158,457 | Kegresse | May 16, 1939 |
| 2,339,886 | Shannon | Jan. 25, 1944 |
| 2,374,240 | Shankman | Apr. 24, 1945 |
| 2,592,542 | Curtis | Apr. 15, 1952 |
| 2,860,715 | Bouffort | Nov. 18, 1958 |
| 2,936,196 | Baudelot et al. | May 10, 1960 |

FOREIGN PATENTS

| | | |
|---|---|---|
| 604,049 | Great Britain | June 28, 1948 |